United States Patent [19]

Eager, Jr. et al.

[11] 4,032,381

[45] June 28, 1977

[54] EXTRUDED SOLID DIELECTRIC HIGH VOLTAGE CABLES WITH MULTI-LAYER INSULATION

[75] Inventors: George S. Eager, Jr., Upper Montclair; David W. Riley, Plainfield, both of N.J.

[73] Assignee: General Cable Corporation, Greenwich, Conn.

[22] Filed: Apr. 25, 1975

[21] Appl. No.: 571,551

Related U.S. Application Data

[62] Division of Ser. No. 466,081, May 1, 1974, abandoned.

[52] U.S. Cl. ............................... 156/51; 156/244; 174/120 R; 264/174
[51] Int. Cl.² .......................................... H01B 7/02
[58] Field of Search ............................. 156/51–53, 156/56, 244; 264/174; 425/113; 174/127, 141 C, 140 C, 120 R, 120 C, 110 R; 310/196

[56] References Cited

UNITED STATES PATENTS

| | | | |
|---|---|---|---|
| 3,404,432 | 10/1968 | White et al. | 264/174 X |
| 3,441,660 | 4/1969 | Garner | 174/127 X |
| 3,502,752 | 3/1970 | Brown | 264/174 X |
| 3,828,115 | 8/1974 | Hvizd | 174/127 X |

*Primary Examiner*—David A. Simmons
*Attorney, Agent, or Firm*—Roy C. Hopgood; John M. Calimafde; Eugene J. Kalil

[57] ABSTRACT

Electrical cables that carry higher voltage require insulation of greater thickness. This invention extrudes the insulation over a cable core and extrudes it in superimposed layers which fuse to one another to prevent formation of voids within the insulation. The insulation applied in each superimposed layer increases the impulse breakdown stress in volts per mil of insulation thickness. A high voltage cable for any given voltage can, therefore, have a thinner insulation if the insulation is applied in layers according to this invention instead of being applied in a single layer in accordance with the practice of the prior art.

4 Claims, 4 Drawing Figures

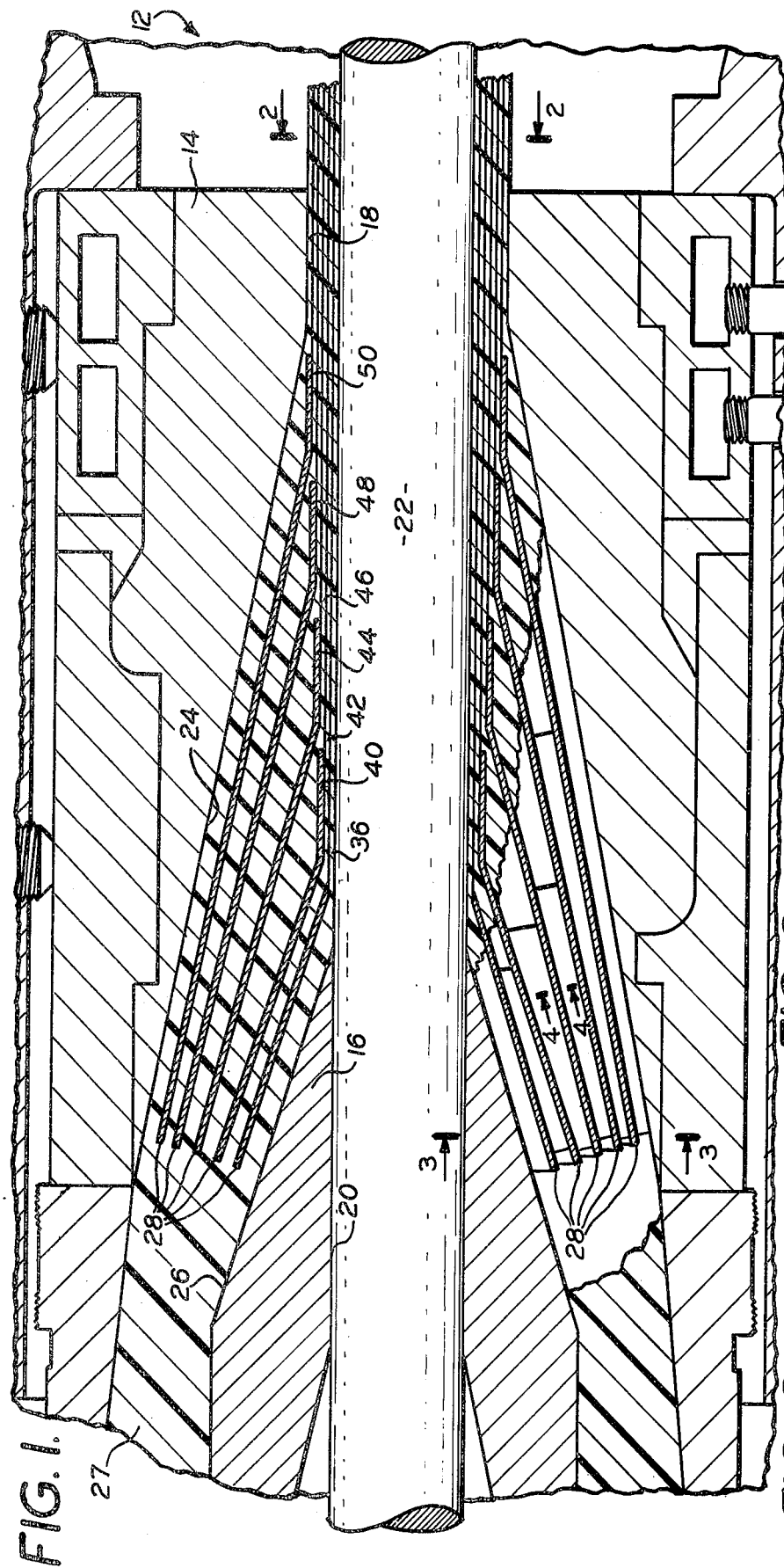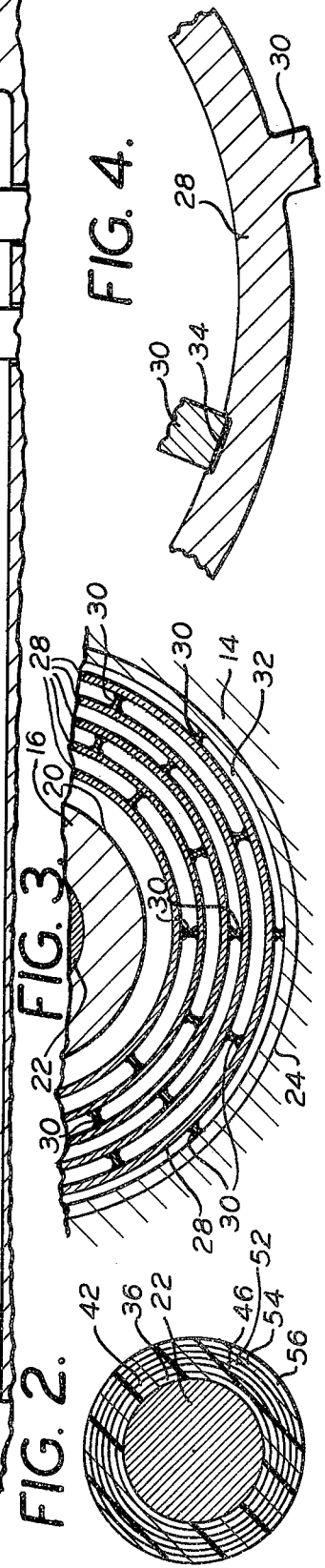

EXTRUDED SOLID DIELECTRIC HIGH VOLTAGE CABLES WITH MULTI-LAYER INSULATION

RELATED APPLICATION

This application is a division of application Ser. No. 466,081, filed May 1, 1974, now abandoned.

BACKGROUND AND SUMMARY OF THE INVENTION

When electrical cables are made for higher voltage with progressively thicker walls of extruded solid insulation, the voltage breakdown stress in volts per mil of insulation thickness becomes progressively lower. For chemically cross-linked, extruded polyethylene insulation, the following results have been observed.

| Wall Thickness, mils | 90 | 175 | 345 |
|---|---|---|---|
| Impulse Breakdown Stress, Volts/mil at 25° C, avg. | 2200 | 1800 | 1500 |

Similar results have been observed with other kinds of extruded dielectrics. In order to prevent higher voltage cables from having lower total breakdown stress, it is necessary, therefore, to increase the thickness of the insulation out of proportion to the increase in voltage. This adds to the cost, cross-section and the weight of the cable. Increased cost is always objectionable. Increased cross-section and weight are both particularly objectionable when cables are to be put in conduits; and increased weight is particularly objectionable for overhead cables.

This invention increases the voltage stress that an extruded insulation can withstand and thereby reduces the required thickness of insulation for a cable designed for any particular voltage. Instead of extruding the insulation as a single layer around the conductor, this invention extrudes a plurality of relatively thin layers which are fused together to form the wall of insulation.

All of the layers are preferably extruded at the same time in the same extruder which has concentric frusto conical partitions of progressively larger diameter for extruding the layers simultaneously in the same extruder die. Although all of the layers are made from the same supply of insulating material, and fused together as they come from the respective frusto conical partitions, the voltage stress that the insulation can withstand is greatly increased. For example, an insulation wall extruded as a single layer 345 mils in wall thickness, and capable of withstanding 1,500 volts per mil average stress, is capable of withstanding 3,000 volts per mil if the same thickness of insulation is extruded over the conductor in six layers to a total of the same wall thickness.

For applying all of the layers simultaneously, an extruder die is constructed with concentric frusto conical partitions spaced from one another so as to extrude concentric layers of substantially equal thickness and at locations where the layers flow together and fuse to one another to eliminate voids between layers and to form a solid wall. All of the spaces between partitions preferably receive the plastic insulating material from the same crosshead and, therefore, receive their material from the same batch.

The reason for the higher voltage stress that can be withstood by the insulation of this invention may be because imperfections that result in breakdown of single layer insulation cannot be of the same radial extent in a multi-layer wall with each layer extruded as a relatively thin coating; and it may also be that such imperfections as exist in the mutli-layer wall are scattered lengthwise and circumferentially so that they never line up to produce an imperfection of the size which can exist in the single layer insulating wall.

Other objects, features and advantages of the invention will appear or be pointed out as the description proceeds.

BRIEF DESCRIPTION OF DRAWING

In the drawing, forming a part hereof, in which like reference characters indicate corresponding parts in all the views;

FIG. 1 is a diagrammatic sectional view illustrating the construction of a die for applying mutli-layer extruded insulation to an electrical conductor in accordance with this invention;

FIG. 2 is a sectional view taken on the line 2—2 of FIG. 1;

FIG. 3 is a fragmentary, sectional view taken on the line 3—3 of FIG. 1; and

FIG. 4 is a greatly enlarged fragmentary sectional view taken on the line 4—4 of FIG. 1.

DESCRIPTION OF PREFERRED EMBODIMENT

FIG. 1 shows an extruder 12 which includes a die 14 and a tip 16, both of which have aligned openings 18 and 20, respectively, through which a conductor or cable core 22 travels with continuous motion. The die 14 has a frusto conical inner face 24; and the tip 16 has a frusto conical outer face 26 which confronts the die face 24 but which is spaced from it by a substantial distance to leave clearance between these confronting faces of the passage of plastic 27 from a crosshead (not shown), to the core 22.

Within the space between the confronting faces 24 and 26 there are a plurality of partitions 28. Each of these partitions is of frusto conical shape throughout most of its length and these partitions 28 divide the clearance between the faces 24 and 26 into six annular passages, which are coaxial, leading from the crosshead discharge to the core 22 of the cable. In the drawing, the thickness of the partitions 28 is exaggerated for clearer illustration. They are preferably made of sheet metal so that they are thin and offer minimum obstruction to the flow of the plastic 27; though they must be stiff enough to avoid distortion between their regions of support.

FIG. 3 shows the manner in which the partitions 28 are supported from one another and ultimately from the face 26 of the die 14. There are fins 30 welded to the outside surface of the outermost partition 28 at angularly spaced locations around the circumference of the outermost partition. These fins extend into contact with the frusto conical face 24 of the die 14 and the length of these fins 30 determines the width of the annular passage 32 between the face 24 and the outside surface of the innermost die 28.

In like manner, all of the other partitions 28 have similar fins 30 welded, or otherwise secured, to the outside surfaces of the partitions at angularly spaced locations for contact with the inside surface of the next adjacent partition so as to maintain the spacing of the partitions from one another. In the preferred construction, each of the fins 30 is located in position to extend into a recess 34 (FIG. 4) in the face of the partition 28 with which it contacts. These recesses 34 are at least as long as the fins 30 and they serve to prevent rotation of any of the partitions about their common axis which is the axis of the die 14 and the core 22. By preventing rotation of the partitions with respect to one another, the fins 30 can be maintained in the same relationship with respect to other fins of the respective partitions.

The partition 28 which is nearest to the tip 16 has its inner end spaced from the circumference of the core 22 by a distance equal to the desired thickness of the first layer of insulation that is to be applied to the core 22. FIG. 1 shows a layer 36 of insulation applied to the core 22 by the first partition 28 which acts as a die for extruding this first and inner layer 36.

Because of the geometry of the extruder 12, most of the partitions 28 require a circumferential portion 38 at their inner ends which are closest to the core 22. The second partition 28 has such a cylindrical portion 40 which cooperates with the passage between the first two partitions and with the cable core 22 to extrude a second layer 42 over the first layer 36 of insulation.

The third partition has a cylindrical portion 44 which serves to control the application of a third layer 46 over the other two layers of insulation. These cylindrical portions 40 and 44 control the outlet of the spaces between adjacent partitions so as to limit the cross-section of the plastic flow from the passages between the partitions as will be apparent from FIG. 1.

In like manner cylindrical portions 48 and 50 at the inner ends of the subsequent frusto conical partitions control the flow of plastic to build up subsequent layers of plastic until the core 22 has a wall of insulation comprising 6 layers. It will be understood that the number of layers and the thickness of the layers applied to the cable core 22 will depend upon the voltage for which the cable is intended to be used. More layers are effective in raising the breakdown voltage in volts per mil thickness of the insulation wall; but the extrusion of extremely thin layers makes the operation of the extruder more critical and less reliable. In the preferred embodiment of the invention, the partitions 28 and their cylindrical portions 40, 44, 48 and 50 are constructed so as to extrude layers of approximately 50 mils in thickness, but this is not a critical value and is given merely by way of illustration.

Another feature of the construction of the extruder 12 is important. All of the layers 36, 42, 46, etc. are extruded simultaneously and at locations which are within a length of the core 22 in which each layer is still molten when the other layer is extruded over it. This causes the successive layers to fuse together so that there will be no voids between them; and the manner in which they are all extruded in the same extruder eliminates the entrance of any air between successive layers of the insulation. Although the layers are applied successively to the traveling cable core and over one another, the final wall of insulation on the cable core is a homogeneous construction in which the interfaces between the layers have merged into one another and left the insulation as a one piece construction. The extruder 12 can be constructed so that all of the layers applied around the core 22 are of the same radial thickness, if desired.

Except for the greater spacing between the confronting face 24 of the die 14 and the confronting face 26 of the tip 16, and the presence of the partitions 28 with the cylindrical portions on the inner ends of most of the partitions, the extruder 12 is of conventional construction with the material supplied from a crosshead to the clearance between the die 14 and tip 16 at extrusion temperatures and pressures. Such extruder construction and operation is well known and no description of it is necessary for a complete understanding of this invention.

FIG. 2 is a cross-section through the cable core will all of the layers of insulation applied. The three innermost layers are designated by the reference characters 36, 42 and 46 as in FIG. 1 and the three outermost layers are designated by the reference characters 52, 54 and 56. As already explained, the insulation is not actually in physical layers by the time it reaches the section 2—2 because all of the layers have merged into one common insulation wall; but the portions of the insulation which were applied as layers are so indicated in FIG. 2 to emphasize the construction of the insulating wall and to show the circumferential extent of the layers as applied, and before they merge into a unitary coating.

The insulation commonly used for electric cable is polyethylene but it will be understood that other plastic materials suitable for insulation can be extruded by the apparatus of this invention, such as polypropylene, ethylene-propylene rubber.

The preferred embodiment of the invention has been illustrated and decribed, but changes and modifications can be made and some features can be used in different combinations without departing from the invention as defined in the claims.

What is claimed is:

1. The method of raising the electrical breakdown stress in volts per mil of thickness of the insulation on a cable which comprises applying the insulation to a cable core in a single extruder through which the cable core passes and as a plurality of successive layers of the same composition insulating material superimposed over one another to a predetermined total radial thickness of the insulation, the successive layers being formed by breaking up the mass of insulating material in the extruder into a plurality of separate streams, and extruding the separate streams as said plurality of successive layers around the cable core, and supplying said layers by simultaneous extrusion and at temperatures that cause the layers to fuse to one another free of voids at the interfaces of the successive layers.

2. The method described in claim 1 characterized by applying insulation for an intended voltage potential by applying over a semi-conducting layer of a high voltage cable of layer of insulation of insufficient thickness for the intended high voltage, and then applying the additional layers of insulation of the same insulating material to build up the total thickness of the insulation to that required for the intended voltage at the higher volts per mill stress obtained by using the multi-layer application of the insulation.

3. The method described in claim 1 characterized by supplying a mass of the insulating material to a cable core in a single extruder through which the cable core passes, breaking up the mass of insulating material in a closed chamber and into a plurality of separate streams as the material passes through the closed chamber of the extruder, and extruding the streams of broken up insulation as a plurality of superimposed layers that bring the insulating material together in fused together layers around the cable core, and extruding each of the successuve layers in rapid succession along the length of previously extruded layers while each previously extruded layer remains hot enough to fuse to the layer that is extruded over it.

4. The method described in claim 3 characterized by extruding all of the layers simultaneously in the same extruder with each superimposed layer applied over the underlying layer adjacent to the location at which the underlying layer is applied and at the same time that the underlying layer is being applied whereby the layers are at extrusion temperature and fused to one another as they are brought into contact, and extruding the layers of insulating material in successive layers of substantially the same thickness and of an order of thickness of about 50 mils.

* * * * *